(No Model.) 3 Sheets—Sheet 1.

E. REYNOLDS.
RUBBER STAMP.

No. 380,349. Patented Apr. 3, 1888.

WITNESSES:
Chas. T. Schmelz
Israel Plummer

INVENTOR:
Edwin Reynolds
per S. Scholfield
Attorney (No Model.) 3 Sheets—Sheet 2.

E. REYNOLDS.
RUBBER STAMP.

No. 380,349. Patented Apr. 3, 1888.

Witnesses.
John S. Lynch.
Mark A. Heath.

Inventor.
Edwin Reynolds.
per S. Scholfield,
Attorney.

(No Model.)   3 Sheets—Sheet 3.

E. REYNOLDS.
RUBBER STAMP.

No. 380,349.   Patented Apr. 3, 1888.

Witnesses.
Mark H. Heath,
James W. Beaman.

Inventor:
Edwin Reynolds.
per S. Scholfield.
attorney.

UNITED STATES PATENT OFFICE.

EDWIN REYNOLDS, OF PROVIDENCE, RHODE ISLAND.

RUBBER STAMP.

SPECIFICATION forming part of Letters Patent No. 380,349, dated April 3, 1888.

Application filed April 15, 1886. Serial No. 199,034. (No model.)

*To all whom it may concern:*

Be it known that I, EDWIN REYNOLDS, of Providence, in the State of Rhode Island, have invented a new and useful Improvement in Rubber Stamps, of which the following is a specification.

My invention relates to that class of rubber stamps which include the combination of the rubber die and die-plate with the inking-pad; and my invention consists in the combination, with the rubber die and die-plate removably supported at each end by means of a spring, of the inking-pad arranged in hinged or pivoted connection with the die-holding box, as hereinafter fully set forth.

Figure 1:
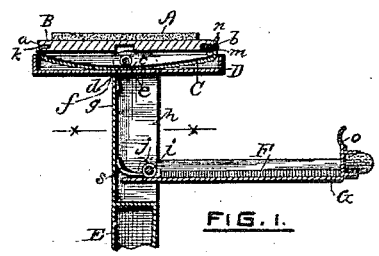
Figure 2:
Figure 6:
Figure 3:
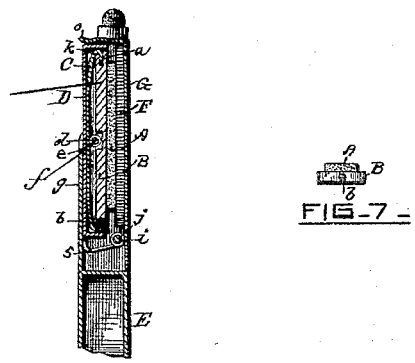
Figure 7:
Figure 4:
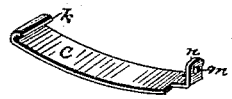
Figure 5:
Figure 8:
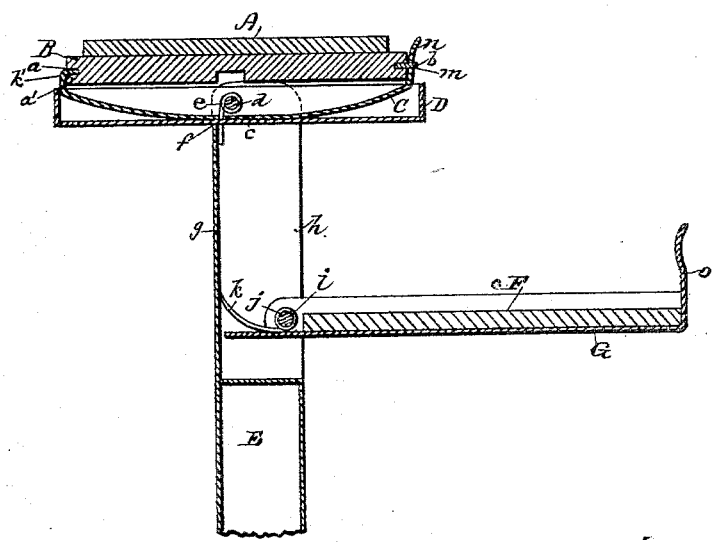
Figure 9:
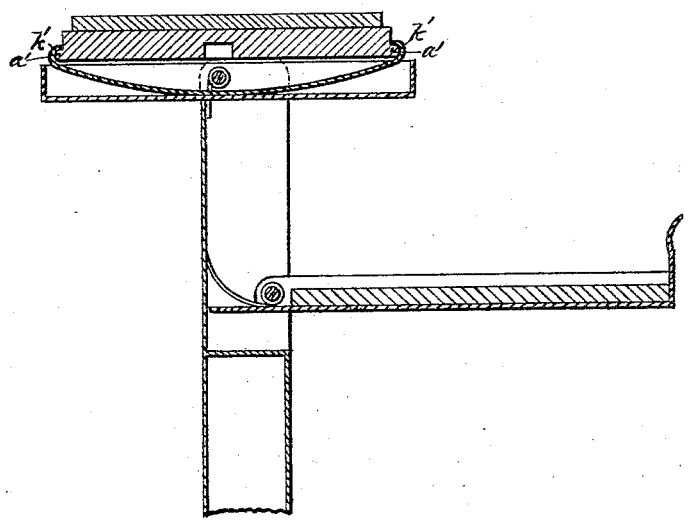

Figure 1 is a longitudinal section of the rubber stamp and its holding-spring, in combination with an inking-pad and handle, the handle being broken away in the drawings. Fig. 2 is a plan view of the same with the rubber die and die-plate removed. Fig. 3 is a longitudinal section showing the rubber die as closed into contact with the inking-pad. Fig. 4 is a perspective view of the holding-spring. Fig. 5 represents a section taken in the line $x\ x$ of Fig. 1. Figs. 6 and 7 are opposite end views of the die-plate and die, showing the holding slot or lip and pin. Fig. 8 is an enlarged view of Fig. 1. Fig. 9 is a longitudinal section showing a modification of the die-plate and the holding-spring.

In the accompanying drawings, A is the rubber die, secured to the die-plate B, which is provided at one end with a groove, $a$, and at the opposite end with a fixed pin, $b$. The die-holding spring C is made of sheet metal, and is attached to the bottom of the holding-box D at the middle point, $c$, by means of solder or otherwise, and is provided at one end with a flat hook, $k'$, adapted to enter the groove $a$ of the die-plate, and at the other end with a tongue, $n$, having a hole, $m$, adapted to receive the pin $b$. The box D, which serves to hold the spring C and the attached die-plate B and die A, is pivoted to the shank $g$ of the handle portion E by means of the pivot $d$, upon which is placed the coiled-wire spring $e$, which is adapted to hold the box D against the shoulder $f$ in the position for use, as shown in Fig. 1. The shank $g$ of the handle portion E is made open at the side $h$, in order that the box D may be turned within the hollow of the shank $g$ to the position shown in Fig. 3 against the resilient action of the spring $e$. The inking-pad F is held at the bottom of the box G, which is pivoted to the shank $g$ of the handle portion E at the pivot-pin $i$, upon which is placed the coiled-wire spring $j$, the free arm $s$ of which rests against the rear inner side of the shank $g$, and serves to hold the pad-box G in its opened position at right angles to the shank $g$, as shown in Fig. 1, and also to carry the box G to this position from its closed position with the die, as shown in Fig. 3, whenever the box G is released from the locking action of the flat spring $o$ at the outer end of the box G against the adjacent end of the die-holding box D.

In order to secure the removable die A and die-plate B to the holding-spring C, the hook $k'$ is made to enter the groove $a$ at one end of the die-plate, and the opposite end of the die-plate is to be brought down until the projecting pin $b$ enters the hole $m$, made in the end portion, $n$, of the spring C, the end $n$ being slightly bent outward in order that the same may be readily and conveniently caught over the pin; and when the die-plate B is so held by the spring the face of the die A will readily conform to any required degree of angular variation of the plane of the inking-pad and the die-holding box D, and also of the surface to which the stamp is applied, so that a full and clear impression can always be obtained without taking special thought or care in placing the die.

It is to be understood that, instead of cutting or forming the groove $a$ in the end of the die-plate, a projecting lip, $a'$, otherwise formed will serve to connect the die-plate to the hook portion of the spring, and in some cases the full projecting end of the die-holder, which projects beyond the rubber die, will serve for this purpose.

It is also to be understood that I do not limit my invention to the combination of the die-holding box, holding-shank, and the inking-pad box attached to the holding-shank, but also include the direct pivot attachment of the inking-pad box with the die-holding box, without the intervention of the shank, as is common in rubber stamps.

The spring which holds and supports the die-plate may also be constructed as shown in Fig. 9, which shows a hook, $k'$, at each end of the spring, which is adapted to engage with the lip $a'$ at each end of the die-plate, respectively, and by this means the die-plate will be removably supported by the spring within the die-holding box.

I claim as my invention—

1. The die-plate for rubber stamps, provided at one end with a projecting lip and at the other with a projecting pin, substantially as and for the purpose specified.

2. The combination of the die-plate, provided at one end with a projecting lip and at the opposite end with a projecting pin, with the holding-spring, provided at one end with a hook adapted for engagement with the groove or projecting lip of the die-plate and at the opposite end with a perforation adapted to receive the projecting pin, and the holding box or support for the spring, substantially as described.

3. The combination of the removable die-plate, a supporting and holding spring, the box for holding the same, and the inking-pad box connected to the die-holding box, substantially as described.

4. The combination of the removable die-plate, its supporting and holding spring, the box for holding the same, pivoted to the hollow shank of an extension or handle, and the inking-pad box, also pivoted to the hollow shank and adapted for folding engagement with the die-holding box, substantially as described.

EDWIN REYNOLDS.

Witnesses:
SOCRATES SCHOLFIELD,
JOHN S. BARDEN.